United States Patent [19]
Cowley

[11] 3,854,495
[45] Dec. 17, 1974

[54] PRESSURE REGULATOR
[76] Inventor: John James Cowley, 235 Carmichael Ave., Toronto, Ontario, Canada
[22] Filed: May 8, 1972
[21] Appl. No.: 250,868

[52] U.S. Cl............................. 137/505.44, 251/121
[51] Int. Cl.......................................... F16k 31/365
[58] Field of Search.................. 137/505.44, 505.45; 251/61.1 UX, 120, 121, 210

[56] References Cited
UNITED STATES PATENTS

| | | | |
|---|---|---|---|
| 862,867 | 8/1907 | Eggleston | 251/61.1 UX |
| 868,599 | 10/1907 | Coleman | 137/505.44 |
| 1,294,908 | 2/1919 | Hill | 251/120 X |
| 1,510,802 | 10/1924 | Scott | 251/121 |
| 1,648,337 | 11/1927 | Ewan | 137/505.44 |
| 1,842,236 | 1/1932 | Bastian | 137/505.44 X |
| 2,360,178 | 10/1944 | Turpin | 137/505.44 |
| 2,578,005 | 12/1951 | Glasgow | 251/120 X |
| 2,650,456 | 9/1953 | Mosier | 137/505.45 |
| 2,651,147 | 9/1953 | Eichelman | 137/505.45 X |
| 2,753,887 | 7/1956 | Meincke | 137/505.25 |
| 2,908,158 | 10/1959 | Jacobsson | 137/505.44 X |
| 3,095,176 | 6/1963 | Hunt | 137/454.6 X |

Primary Examiner—Harold W. Weakley
Attorney, Agent, or Firm—Westell & Hanley

[57] ABSTRACT

A gas flow regulator intermittently connects high with regulated pressure by a tube seating at the bottom of a well bore where the regulated pressure opens the seal below the desired value and closes the seal slightly above the desired value.

4 Claims, 7 Drawing Figures

PRESSURE REGULATOR

This invention relates to a regulator for controlling the pressure of gas in a chamber or reservoir, received from a high pressure source of such gas which high pressure source may vary due to the depletion of the gas at the supply or for other reasons.

Pressure regulators of the type with which the invention is concerned provide a controlled sealable access for gas at high pressure, to a chamber or reservoir at a regulated pressure, and provide a sensor of the pressure in the chamber or reservoir determining the pressure therein, and means connected to respond to the sensor designed so that, in response to the pressure falling below a predetermined amount, such access is opened and in response to the pressure rising above a predetermined amount such access is closed. In such pressure regulators, the pressure required to seal off the access of the gas from the high pressure source to the chamber or reservoir, is a source of error in the regulator and varies with the hardness of the softer or the sealing surfaces (increasing with the hardness) and with the area of the high pressure sealed aperture (increasing with the area). In this invention the sealing surfaces are a tube end relatively movable into and out of sealing contact with the seat and the inventive design allows use of a relatively soft seat to lower the sealing pressure.

It is an object of this invention to provide an improved design for a gas flow regulator which allows the use of a softer sealing surface than was possible with former designs.

It is an object of this invention to provide an improved design for a gas or fluid flow regulator which allows the use of a smaller high pressure sealed aperture than was possible with former designs.

Prior pressure regulators were so designed that the throttling action, associated with a nearly sealed access, took place across the sealing surface. This resulted in erosion of the sealing surface, and in channelling and leakage thereacross with these deleterious effects tending to increase with the softness of the surface.

It is an object of this invention to provide an improved pressure regulator wherein most of the throttling action associated with an almost sealed access takes place elsewhere than at the sealing surface. Hence softer sealing materials may be used than formerly and with less erosion, etc. of the surface.

Prior pressure regulators provide that the connection of the sealing member to the pressure member is through the sealed aperture. This necessarily enlarges the area of the sealed aperture and the consequent error in regulator-determined pressures.

It is an object of this invention to provide a regulator where in the connection between the sealing member and the pressure member is exterior to the sealed aperture allowing design for a smaller sealable aperture and reducing the regulator error.

Better stabillity of operation in a regulator is achieved when the gas is more gradually closed off than when transition from flow to no flow is more sudden. In a preferred embodiment of the invention, therefore, throttling means are provided to throttle the flow of gas leaving the tube end and the regulator if designed so that movement of the tube end toward and away, respectively, from the seat causes an increase and decrease in such throttling action.

In regulators where a diaphragm is used, the diaphragm movement should be as small as possible since errors become more significant with increased travel. This invention allows for regulation with a minimum of disphargm movement by providing, after a predetermined amount of movement of the tube end away from the valve seat, that the gas escaping from the tube end has a relatively large aperture for escape into the diaphragm chamber which increases at a relatively rapid rate with diaphragm travel.

It is an object of a preferred embodiment of this invention, to provide a low friction connection between the diaphragm on the one hand, and the means controlling relative position between the tube end and the seat.

It is an object of this invention to provide a gas flow regulator wherein there is achieved the optimum design between maximum flow capability and smallest regulator size. It is found that this is acheived when the smallest seal off area is combined with the smallest diaphragm travel.

In the drawings which illustrate a preferred embodiment of the invention:

Figure 1:
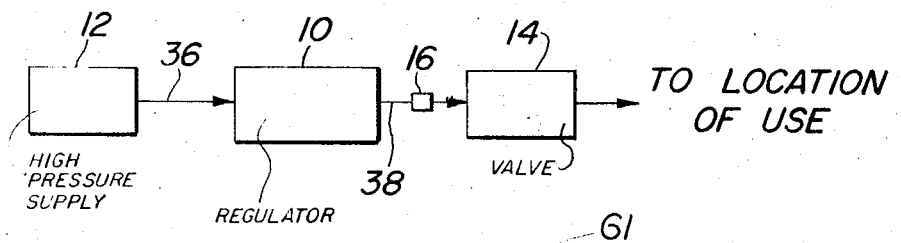
FIG. 1 shows a schematic arrangement of a high pressure supply, the regulator, and a valve.
Figure 6:
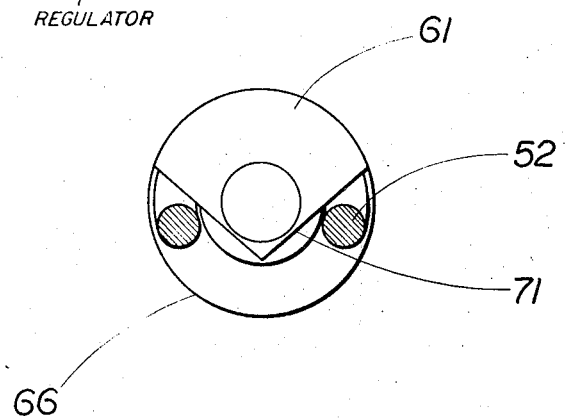
FIG. 6 shows a bottom view of the seat connection for the linkage.

In the drawings, FIG. 1 shows that the regulator 10 which is the subject of the invention is located between the high pressure source 12 and a valve 14, the valve being located between the regulator and the location of use which may be an oxygen mask or other end use dependent on the function of the assembly and the type of gas. In the commonest use of the device, the valve 14 is of the on and off type and a restrictor 16 is provided between the valve and the regulator. Thus in the commonest use, when the control valve is "off" the regulated pressure at the regulator is static or rising to its regulated value under the control of the regulator; while, when the control valve is "on" the regulated pressure at the regulator is falling toward the pressure at the location of use at a rate controlled by the restrictor 16.

Figure 2:
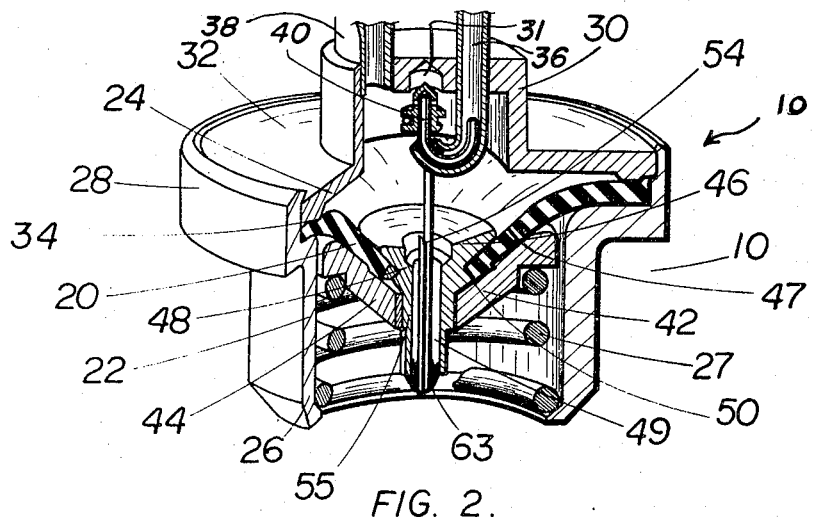
FIG. 2 shows a perspective, cut-away view of a regulator in accord with the invention.

In FIG. 2 is shown the regulator which comprises a circular rubber diaphragm 20 clamped between the spring holding member 22 and the cover member 24 which acts as the regulator casing. The spring holding member 22 defines a wide central bore, which at one end has a small inwardly turned flange 26 to serve to retain a coil spring 27 in the bore. Remote from the flange 26, the wall of member 22 extends outwardly to be just wider than cover member 24 and at its outer periphery is provided with an axially extending flange 28 extending away from flange 26. Cover member 24 is provided with an axially extending boss 30 and an outwardly extending plate 32 designed to be received within flange 28, which is arranged to extend axially theretowards. The upper edge of flange 28 is turned or swaged over the outward surface of plate 32, as shown, so that the periphery of the diaphragm 20 is clamped between the outwardly extending portion of member 22 and the plate 32, and there is provided on the diaphragm facing surface of plate 32, an annular raised bead 34 located to bear on diaphragm 20 to increase the certainty of clamping. The outwardly extending boss 30 is recessed as shown and is provided in its outer end wall with apertures for inlet conduit 36 from the high pressure source 12 and a larger conduit 38 connected to the restrictor 16 and valve 14. The conduit 36 is located off-center so that it may at its end inside the chamber be provided with a 180° turn to lead to an open end directed away from the diaphragm. Conduit 36 is composed of larger conduit 36A entering the regulator chamber preferably formed of copper or similar tubing and a smaller conduit 40 preferably formed of berylium copper open at both ends and fastened into conduit 36 to project therefrom away from the diaphragm. The joint between conduit 36 and conduit 40 is made such that all the flow from conduit 36A comes out of the axially directed open end of conduit 40 which is shaped (preferably terminated at an edge on a plane perpendicular to the axial direction) to seal on the seat to be described.

The diaphragm 20 is provided with a large central aperture. On the side of this aperture remote from the cover or casing a conical brass member 42 having an inner conical surface 47 points away from the cover member and rests against the diaphragm. The conical member is provided at its wider end with a shoulder 44 facing away from the diaphragm 20 which is shaped to seat the opposite end of the compression spring 27 from the end seated by an inturned flange 26. A brass member 46 is provided with a flange 48 adapted to rest on the diaphragm on the opposite side from the surface 47 of member 42. The member 46 is provided with the shoulder 50 shaped to abut the inner edge of the diaphragm and member 46 is further provided with a sleeve 55 shaped to extend through the aperture in the diaphragm to make a press fit in the central aperture of conical member 42 and with such fit to clamp the inner edge of the rubber diaphragm between the metal members, i.e. between the flange 48 and the conical surface 47. The 'regulator chamber' referred to herein is the space defined between the diaphragm 20 on the one hand and the inwardly facing surfaces of the members 30 and 32 on the other hand. As indicated the sleeve 55 is provided with a relatively large central bore 49. Soldered in the end of said bore remote from tube 30 to extend into the chamber are a pair of wires 52 of stiff but preferably flexible resilient material and which extend through the bore and into the chamber and which diverge and then converge in the area indicated at 54 to provide a widened area for a purpose to be hereinafter described. At their upward extremity, adjacent the level of the 180° turn in tube 40 wires 52 are provided with a bight 53 in an extent transverse to the direction of diaphragm movement. A seat member 56 is provided with a widened portion 58 and a boss 60 extending therefrom in a direction away from the diaphragm.

A well is provided in the member 56 defined by a bore 62 opening into the surface of widened portion 58 remote from boss 60. The bore 62 is defined by a side wall 64 of predetermined dimension larger than the outer surface of tube 40 as hereinafter discussed. The base of the well is covered with a suitable material 67 shaped to seat and seal the end of tube 40 when caused to by the regulator operation. The seat material 67 is preferably teflon, again as hereinafter discussed. The well bore is connected to the chamber through its defining walls by apertures 69 large relative to the clearance between tube 40 and wall 64, and increasing in transverse cross-section from the end nearest the seat 66. The circular apertures 69 satisfy this last criterion since the half area of the circle nearest the seat is used and this provides unthrottled release of the gases from the high pressure source when the open end of tube 40 is opposite the diameter of the apertures 69. The direction of the apertures perpendicular to the direction of movement of tube 40 minimizes any "rocket" action due to the inertia of the gas emitted by the tube and reduces error due to this cause.

The widened portion of the seat member 56 with the well is shaped to define an outwardly facing groove 66A designed to receive the bight of wires 52. The material of seat member 56 bordering the groove on the side thereof remote from boss 60 is cut away at edges 71 to leave approximately an area of circular shape concentric with the groove 66 and subtending an angle of about 90° as shown.

It will perhaps be easier to discuss the characteristics and advantages of the seat and sealing after the assembly of the device is described.

Figure 5:
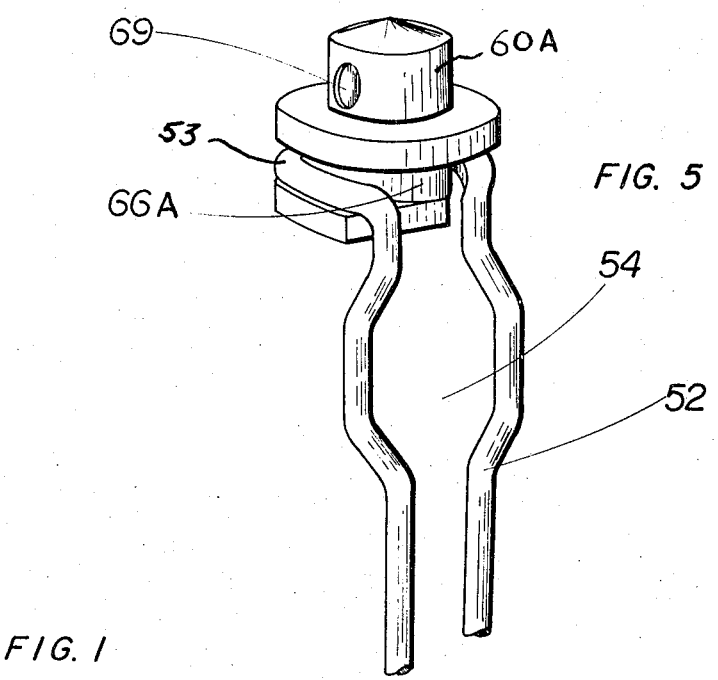
FIG. 5 shows the linkage connection for the seat.

Initially, with the diaphragm 20 and body member 22 removed, the well member is fitted to the resilient wire member by moving remaining portion 61 of the lower of the groove forming ridge through the separated portion 54 of the resilient wire (to the left and away in FIG. 5) and moving the seat member along the wire 52 with the wires 52 riding in the groove 67, until the well member is suspended in the position of FIG. 5 where it will be retained on the wire 52. With these members so assembled the seat member 56 is placed over the open end of the tube 40 so that the open end of tube 40 is facing the seat material 66. It will be noted that the end wall of boss 30 is recessed at 31 to the extent necessary to receive seat member 56. The diaphragm member 20 may then be attached and fixed in place by the attachment of spring casing 22; while the free ends of wires 52 extend downwardly through the open bore 49 in the member 48.

The desired height of the seat 66 above the open end of tube 40 is then calculated having regard for the fact that the tube must be sealed at the desired pressure in the regulator chamber; which chamber is defined by the diaphragm 20 and the cover member 32. With this height calculated, the free ends of the wires 52 are soldered in the bore 49 at the height to achieve this result, at the same time the solder 63 is used to achieve closure of the chamber.

The regulator is then assembled.

The clearance between the outer surface of the tube 40 and the defining wall 64 of the well is made relatively narrow so that the throttling action in air moving out of the high pressure tube will occur between these surfaces rather than across the seat 66 which is of softer material. To improve the accuracy of the design, tube 40 and the inner bore wall 64, are preferably made of metal. The tube 40 is preferably drawn, berylium-copper tubing for accuracy, while the well 64 is reamed. In addition relative to the outer wall of the tube, which preferably has a non-tapering outline, the inner wall of the well is preferably tapered slightly inwardly toward the seat, to provide a smaller clearance at the tube end, than a short distance removed therefrom.

Relatively large apertures 69 are provided in the side of the bore wall these are circular when viewed perpendicular to the tube 40 and well bore axis and are large relative to the clearance between the tube and well and allow in effect unobstructed flow from the end of tube 40 into the chamber when the tube end is aligned with a diameter for the aperture. The circular increasing diameter of the inner half circle of aperture 69 provides that, as the tube end withdraws from the seat, an aperture increasing more rapidly than in proportion to the withdrawal amount of the tube is provided, and this arrangement is found most suitable for the smooth and efficient operation of the regulator.

In the preferred embodiment, the travel of the open end of tube 40 from the seat until it is opposite the innermost part of the well aperture (effective throttling action ceasing when the tube 40 passes this location) is between 0.012 inches and 0.013 inches. Over this travel, which is the extent wherein a tapering clearance between the tube and well sidewalls will have effect, the difference of tube OD and well ID which would be about 0.001 inches at the seat is increased to 0.002 inches at the innermost part of aperture 69. The clearance thus is small enough that the throttling action is performed between the metal of tube and well rather than across the valve seat. On the other hand, the decrease in clearance and increase in throttling action as the tube end approaches sealing position provides for smooth regulator action in sealing and unsealing movement.

As explained, in the introduction, the sealing pressure between the tube end and the seat contributes an error in the pressure determined by the regulator and such error increases with the hardness of the valve seat because this causes increase in the sealing pressure. Accordingly, one of the advantages of the invention is that the design allows the use of a softer seat than with prior designs. In many applications of the invention, the pressures will be very high at the output of the open ended tube. With an oxygen mask having an expendible high pressure source decreasing from 5,000 p.s.i. to small values, or with a continuous source, the pressure on the seating material measured at the opening of the open ended tube, can result, if the seating material is too soft, in the extrusion of the seating material. The extrusion of the seating material depends also on the clearance available for such extrusion, i.e., with the form of this invention, on the clearance at the seat between the tube and the bore wall, so that small clearance provided by the invention, in addition to its throttling action, further assists in allowing the use of a soft sealing material. The small bore opening also reduces the total, potentially extruding pressure exerted on the seating material, both reducing regulator error and allowing the use of softer sealing material.

In the preferred embodiment, therefore, the seat is constructed of teflon, a fluorocarbon with a hardness of about 100 on the Shore scale, this permits sealing with the metal tube end at a much lower pressure than with the metal to metal seals of prior devices. This teflon seat 66 is used with a tube having internal diameter of 0.014 inches and a clearance (measured at low pressure as previously explained) of 0.001 inches between the inside diameter of the well at the seat and the outside diameter of the tube end. It is thus seen that with the inventive design, a much softer (i.e., 100 Shore) seat than metal is available. Other softer seats may be used, including rubber elastomer compounds and with due design adjustments taking into account the softness of the seat, the pressure involved, the clearance between tube and well wall and the diameter of the tube end.

It is found that by making the tube 40 adjacent its free end, sufficiently thin, that the tube will expand or distend a greater amount under higher pressures than low, thus providing, with a variable pressure source, a reduced exterior clearance (higher throttling action) and smooth sealing at low pressures. With the preferred embodiment designed for pressures between the 5,000 p.s.i. and 250 p.s.i. range (for 250 p.s.i. regulator chamber pressure this represents differential pressures across the tube of between 5,250 and 0 p.s.i.) the tube adjacent its end is provided with a wall of 0.005 inch thickness. It is found that the berylium copper tube end diameter under these conditions will enlarge 0.0003 over the 250 to 5,000 p.s.i. range.

The wire bight 53 in the groove 66 of the well defining member, allows slight movement between the wires and the seat member. The two cut-away edges 71 of the groove forming portion of the wall defining member allow pivoting of the wall defining member relative to the wires, about two axes approximately 60° to each other and provide sufficient universal movement to reduce friction and to allow good seating of the seat on the end of tube 40.

In operation, with the regulator chamber at the calibrated pressure, the tube 40 will be held against the seat 66 by the closing pressure of diaphragm 20 over the opposing pressure of spring 27. When the pressure in the chamber falls below the calibrated pressure, the spring 27 opens the tube-seat seal over the diaphragm pressure until the calibrated value is again reached. The calibrated pressure is subject to error due to sealing pressure and tube 40 aria pressure as previously explained but these are minimized by the inventive device. When the tube retraction from the seat is less than the amount to reach the aperture 69, the throttling is obtained between the tube and well walls varying in accord with the well wall taper and with the distension of the tube through the high-pressure inside. When the regulator opens the tube 40 end past the inner end of aperture 69 the area of the aperture increases as retraction continues providing a free exit for the replenishment of the chamber pressure.

Figure 7:
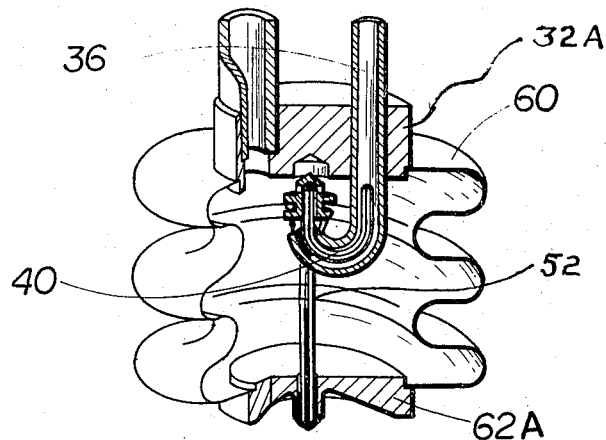
FIG. 7 shows an alternative embodiment of the invention.
Figures 3, 4:
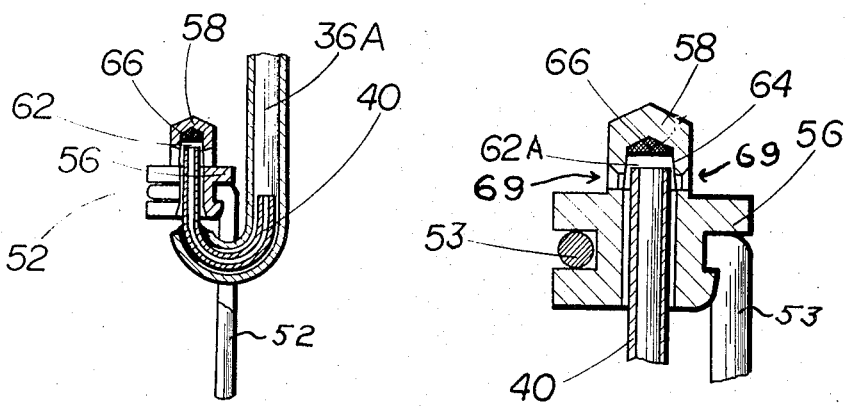
FIG. 3 shows a side view of the tube and the well construction of the regulator of FIG. 1.
FIG. 4 shows an enlarged view of the tube, well and seat.

FIG. 7 shows an alternative embodiment wherein the need for a spring such as spring 27, is obviated by providing a resilient bellows chamber, defined by an end member 32A similar to cover member 32 except that the wide radially extending wall of member 32 is replaced by an extension of the resilient bellows, 60. The members 38, 31, 36 and the cooperating seat members 58, 56 and the coupling linkage 53-52-66A are as described in connection with the embodiment of FIG. 2. The seat-remote end of wires 52 is connected to the end member 62A. The resilient bellows 60 is preferably made of resilient metal. The bellows therefore, assumes its rest position when there is no pressure differential across the walls of the bellows chamber. At a predetermined pressure differential the seat 66 is almost sealing the open tube end. An increase in pressure differential of the inside over the outside of the bellows chamber will cause expansion thereof and increased spacing of the bellows chamber end members 32A and 62A and hence sealing of the tube end. A decrease in pressure differential of the inside over the outside of the bellows chamber will cause contraction thereof and decreased spacing of the bellows chamber end members 32A and 62A and hence movement of the tube end away from the seal. Thus the bias opposing the differential pressure is supplied by the resilient bellows walls.

This design eliminates both the diaphragm and spring assembly, thereby achieving further reduction in cost, and considerably greater size reduction. This performance would also be improved to the extent that the hysterisis present in any flexing elastomeric diaphragm would be eliminated.

I claim:

1. Gas flow regulator including:

a casing, a metal tube having an open end for connection to a high pressure gas source, said tube ending in a resiliently deformable straight metal extent terminating in said open end, a seat member defining therein a closed well with an inner bore defined by a metal wall to receive said straight tube portion in said well bore with predetermined clearance; said metal wall being tapered substantially up to said seat to provide that the said predetermined clearance from such tube will be decreasing in the direction approaching said seat, whereby said resiliently deformable tube and the tapering wall interact to provide a throttling action on gases passing therebetween, and so that such throttling action will increase as said tube open end approaches said seat, material of lesser hardness than the tube and of lesser hardness than the metal wall located in the base of said well, shaped to form a seat for said tube open end, means defining a chamber to receive gas originating with said tube and emerging from said well, a pressure responsive linear actuator responsive to the pressure in said chamber relative to pressure exterior thereto and connected to relatively move said tube open end away from said seat when said relative pressure in said chamber falls below a predetermined value and to relatively move said tube open end into contact with said seat when said relative pressure in said chamber rises above a predetermined value.

2. A gas flow regulator as claimed in claim 1 wherein said chamber is a bellows chamber defined by a pair of end members and a resilient bellows wall extending between them; whereby an increase of differential pressure from inside to outside across the bellows wall tends to expand the bellows chamber by increasing the spacing of the end members and a decrease of said differential pressure across the bellows will tend to contract the bellows chamber by allowing the end members to approach one another, said bellows wall being designed to provide a bias opposing the differential pressure, and wherein said bellows chamber, defined as aforesaid, embodies said pressure responsive linear actuator, said tube being connected to move with one of said end members, and said seat member being connected to move with the other of said end members, the connection of said tube to said one end member and the connection of said seat member to said other end member being designed so that expansion of the bellows chamber moves said tube end toward said seat and contraction of the bellows chamber moves said tube end away from said seat.

3. A device as claimed in claim 1 wherein said well bore is connected by an aperture to said chamber, where said aperture is of large area relative to the cross-sectional area defined by the clearance between the outer wall of the tube and the inner wall of the bore and wherein said aperture is located so that its inner end is at least partially exposed by a predetermined amount of movement in the retraction direction of said tube open end relative to said well bore.

4. A device as claimed in claim 2 wherein said well bore is connected by an aperture to said chamber, where said aperture is of large area relative to the cross-sectional area defined by the clearance between the outer wall of the tube and the inner wall of the bore and wherein said aperture is located so that its inner end is at least partially exposed by a predetermined amount of movement in the retraction direction of said tube open end relative to said well bore.

* * * * *